United States Patent
Morber et al.

(10) Patent No.: US 11,440,410 B2
(45) Date of Patent: Sep. 13, 2022

(54) HEAD-UP DISPLAY FOR A VEHICLE

(71) Applicant: AUDI AG, Ingolstadt (DE)

(72) Inventors: Stefan Morber, Pfaffenhofen (DE); Cedomir Dijanovic, Ingolstadt (DE); Marcus Richter, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 56 days.

(21) Appl. No.: 16/998,124

(22) Filed: Aug. 20, 2020

(65) Prior Publication Data
US 2021/0061103 A1 Mar. 4, 2021

(30) Foreign Application Priority Data
Aug. 26, 2019 (DE) .......................... 102019122780.1

(51) Int. Cl.
| B60K 35/00 | (2006.01) |
|---|---|
| G06T 3/00 | (2006.01) |
| G02B 27/01 | (2006.01) |
| H04N 9/31 | (2006.01) |

(52) U.S. Cl.
CPC ............ B60K 35/00 (2013.01); G06T 3/0093 (2013.01); *B60K 2370/1529* (2019.05); *B60K 2370/785* (2019.05); *G02B 27/01* (2013.01); *G02B 27/0101* (2013.01); *G02B 2027/011* (2013.01); *G02B 2027/014* (2013.01); *H04N 9/3185* (2013.01)

(58) Field of Classification Search
CPC ............ B60K 35/00; B60K 2370/1529; B60K 2370/785; G02B 2027/014; G02B 27/0101; G02B 27/01; G02B 2027/011; G06T 3/0093; H04N 9/3185; H04N 9/3194
See application file for complete search history.

(56) References Cited

U.S. PATENT DOCUMENTS

2017/0085847 A1* 3/2017 Kurosawa .............. B60K 35/00
2018/0158172 A1* 6/2018 Trageser ............ G02B 27/0093

FOREIGN PATENT DOCUMENTS

| CN | 105044910 A | 11/2015 |
|---|---|---|
| CN | 106249409 A | 12/2016 |
| DE | 102007001266 A1 | 7/2008 |
| DE | 102009019945 A1 | 12/2009 |
| DE | 102015109027 A1 | 12/2016 |
| DE | 112015001322 T5 | 1/2017 |

OTHER PUBLICATIONS

German Search Report dated Jan. 30, 2020 in corresponding German Application No. 102019122780.1; 8 pages; Machine translation attached.
Office Action dated Feb. 21, 2022, in connection with corresponding Chinese Application No. 202010854117.1 (11 pp., including machine-generated English translation).
Examination Report dated Sep. 1, 2020 in corresponding German Application No. 10 2019 122 780.1; 7 pages including partial machine-generated English-language translation.

* cited by examiner

Primary Examiner — Douglas M Wilson
(74) Attorney, Agent, or Firm — Maier & Maier, PLLC

(57) ABSTRACT

A method for operating a head-up display (HUD) of a vehicle, in which a control device of a vehicle transforms a display image to be displayed by a windshield of the vehicle into a reflection image to be reflected by the windshield and a display unit of a head-up display of the vehicle that is associated with the windshield displays the transformed reflection image, and a control device for a head-up display of a vehicle and a vehicle.

8 Claims, 1 Drawing Sheet

HEAD-UP DISPLAY FOR A VEHICLE

FIELD

The disclosure relates to a method for operating a head-up display (HUD) of a vehicle, in which a control device of a vehicle transforms a display image to be displayed by a windshield of the vehicle into a reflection image to be reflected by the windshield and a display unit of a head-up display of the vehicle that is associated with the windshield displays the transformed reflection image. The disclosure furthermore relates to a control device for a head-up display of a vehicle and a vehicle.

BACKGROUND

A head-up display is used to display items of information relating to a vehicle or a driving situation of the vehicle to a driver of the vehicle. The driver can visually perceive items of information displayed by the head-up display during travel of the vehicle and simultaneously keep a traffic situation in front of the vehicle in view. The items of information are thus shown to the driver by the head-up display in his normal field of view, i.e., he does not have to look away from the traffic situation to visually perceive the displayed information.

For this purpose, the head-up display comprises a windshield of the vehicle, which is used as a reflection surface, and a display unit associated with the windshield, which displays a reflection image to be reflected from the windshield. The head-up display typically also includes an optical arrangement, which is arranged in a beam path of the head-up display between the display unit and the windshield and comprises at least one lens and/or one mirror. The optical arrangement is configured to optimize the reflection image displayed by the display unit and/or to guide it onto an inner surface of the windshield. The optical arrangement permits wide-ranging flexibility in the positioning and orientation of the display unit in relation to the windshield.

A windshield for a vehicle typically has a nonconstant curvature, which causes a bulge of the windshield as a whole. In a properly installed state, the windshield bulges outward, i.e., an outer surface of the windshield is convexly curved, while the inner surface of the windshield is concavely curved.

The control device is therefore configured to transform a display image to be displayed by the head-up display, which is provided for reflection from a flat reflection surface, into the reflection image to be reflected from the curved windshield in such a way that the driver perceives the display image to be displayed undistorted in spite of the curvature of the windshield. For this purpose, the information carried out by the control device has to be inverse to the distortion caused by the windshield to obtain a distortion-free representation in the interaction of transformation and curvature.

However, the curvature of nominally identical windshields unavoidably varies due to manufacturing tolerances, which can accordingly result in a manufacturing-related distortion of the display.

To remedy this problem, DE 11 2015 001 322 T5 discloses a method for configuring a head-up display of a vehicle, in which one transformation is selected from a plurality of transformations on the basis of predetermined correction patterns to reduce a distortion of a display image displayed by means of a windshield of a vehicle as a result of a manufacturing-related curvature deviation of the windshield.

Another aspect to be taken into consideration in head-up display is that a direction in which the driver is looking is dependent on a driving situation of the vehicle. For example, at a high speed of the vehicle, the driver usually looks at a distant region in front of the vehicle and is therefore has their sight raised, while the driver tends to lower his view at a low speed in order to observe a near region in front of the vehicle.

DE 10 2015 109 027 A1 thus discloses a method for operating a head-up display of a vehicle in which a vertical position of the items of information displayed by means of a windshield of the vehicle is determined in dependence on a driving speed of the vehicle.

However, the curvature of the windshield can vary in the vertical direction, so that changing the vertical position of the display is accompanied by a distortion of the display.

DE 10 2007 001 266 A1 is directed to this problem and discloses a method for operating a head-up display of the vehicle, in which an optical sensor detects an eye position of a driver of the vehicle in dependence on a driving speed of the vehicle and a control device calibrates the head-up display progressively in real time during travel of the vehicle in dependence on the detected eye position.

Many head-up displays are furthermore configured to provide augmented reality (AR) for the driver, i.e., to highlight, mark, supplement, and the like real objects arranged in a region in front of the vehicle and visible through the windshield. This presumes fixed spatial relationships between the real objects and the AR augmentations displayed by the head-up display.

However, the windshield is dynamically deformed during and as a result of driving of the vehicle, for example, due to an air resistance varying with the driving speed, from which an undesired distortion of the display of the head-up display also results. Such a dynamic distortion in particular changes the spatial relationships between the real objects and the AR augmentations and is perceived as particularly annoying by the driver, since he perceives different spatial relationships between the real objects and the AR augmentations at different driving speeds.

SUMMARY

The invention is therefore based on the object of proposing an improved operating method for a head-up display of the vehicle, which enables an at least nearly distortion-free display independently of a driving speed of the vehicle. In addition, it is an object of the invention to provide a control device for a head-up display of the vehicle and a vehicle.

One subject matter of the invention is a method for operating a head-up display (HUD) of a vehicle, in which
  a control device of a vehicle transforms a display image to be displayed by means of a windshield of the vehicle into a reflection image to be reflected from the windshield; and
  a display unit of the head-up display associated with the windshield displays the transformed reflection image.

The invention can be used for any head-up display of a vehicle, whereby a variety of possible applications results.

According to the invention, the control device for transforming the display image defines a warping matrix as a function of a value of a driving speed of the vehicle. Warping is understood as a technology which enables compensation of two-dimensional distortions of a two-dimensional image, for example, a so-called pillow effect. In the case of the head-up display, the distortions to be compensated for upon warping are caused by the curvature of the windshield. The warping matrix used for the transformation is a function of the driving speed in order to take into consideration the speed dependence of the curvature. In this way, the transformation of the display image may be adapted individually to any driving speed.

In a preferred embodiment, the speed-dependent determination of the warping matrix comprises using two or more than two constant warping matrices associated with predetermined values of the driving speed which are different from one another. The constant warping matrices can cover a range of driving speeds of the vehicle and are selected by the control device as a function of the current driving speed of the vehicle, i.e., different constant warping matrices are used in succession during driving of the vehicle.

The speed-dependent determination of the warping matrix advantageously comprises using a constant warping matrix associated with the value zero of the driving speed and at least one constant warping matrix associated with a nonzero value of the driving speed. The constant warping matrix associated with the value zero enables a distortion-free display when the vehicle is stationary, for example, at a red traffic signal or in a traffic jam. The at least one custom warping matrix associated with a nonzero value is used to reduce a dynamic distortion. Multiple constant warping matrices each associated with a different nonzero value can better counteract a dynamic distortion of the display over a range of driving speeds.

Preferably, the speed-dependent determination of the warping matrix for a value of the driving speed different from each predetermined value of the driving speed comprises an interpolation starting from at least one constant warping matrix associated with a predetermined value of the driving speed and as a function of the value of the driving speed. By means of interpolation, a distortion of the display may be further reduced for values of the driving speed between the predetermined values. Moreover, jumping of the display when changing the constant warping matrix is prevented.

In further embodiments, the control device receives the value of the driving speed indirectly or directly from a sensor of the vehicle. For example, the control device can receive current values of the driving speed transmitted from a further control device of the vehicle, such as a navigation device.

The subject matter of the invention is also a control device for a head-up display of a vehicle, which is configured to transform a display image to be displayed by means of a windshield of a vehicle into a reflection image to be reflected from the windshield. Each head-up display of a vehicle comprises such a control device, so that the invention can be used in a variety of ways. The control device can be integrated here either into the display unit of the head-up display or into an infotainment system of the vehicle.

According to the invention, the control device is configured to determine a warping matrix for transforming the display image as a function of a value of a driving speed of the vehicle. The control device is thus capable of compensating for a dynamic deformation of the windshield, for example, due to an air resistance during driving of the vehicle. If a control device integrated into an infotainment system of the vehicle may not be configured in this way, the head-up display may nonetheless be retrofitted in terms of the invention without modification of the infotainment system, by integrating the control device into the display unit of the head-up display.

In advantageous embodiments, the control device comprises a constant warping matrix associated with the value zero of a driving speed of the vehicle and at least one constant warping matrix associated with a nonzero predetermined value of the driving speed. The constant warping matrices can be stored in a local memory of the control device. The constant warping matrix associated with the value zero is used for transformation by the control device when the vehicle is stationary, while the further constant warping matrices can be used during driving of the vehicle.

In preferred embodiments, the control device comprises an interpolation module which is configured to interpolate the warping matrix for a value of the driving speed different from each predetermined value starting from at least one constant warping matrix associated with a predetermined value as a function of the value of the driving speed. The interpolation module calculates warping matrices for values of the driving speed which are between the predetermined values. The interpolation module is advantageously implemented as software using which already provided control devices may be retrofitted for the method according to the invention.

In further embodiments, the control device comprises an interface which is configured to receive a value of a driving speed of the vehicle. For example, the interface can be a standardized interface for a bus system of the vehicle.

Furthermore, the subject matter of the invention is a vehicle having a windshield, a display unit associated with the windshield, a sensor providing a value of a driving speed of the vehicle, and a control device according to the invention which is connected directly or indirectly to the display unit and the sensor. The vehicle accordingly comprises a head-up display which enables at least nearly distortion-free display in spite of a dynamic deformation of the windshield during driving of the vehicle. The control device can be indirectly connected to the sensor, for example, via a bus system of the vehicle having a further control device of the vehicle, such as an ESP control device having a wheel speed sensor or a navigation device having a GPS sensor.

The head-up display is suitable in particular for displaying augmented reality, since it ensures fixed spatial relationships between real objects arranged in a region in front of the vehicle and visible through the windshield and augmented reality independently of a driving speed.

One essential advantage of the operating method according to the invention for a head-up display of the vehicle is that distortion of a display of the head-up display due to a dynamic deformation of the windshield is at least almost avoided. The driver is not annoyed by varying spatial relationships between real objects and AR expansions when displaying an augmented reality. It is furthermore advantageous that an existing head-up display can be retrofitted for the operating method.

BRIEF DESCRIPTION OF THE DRAWINGS

The invention is schematically illustrated on the basis of an embodiment in the drawings and is described further with reference to the drawings. In the figures.

DETAILED DESCRIPTION

Figure 1:
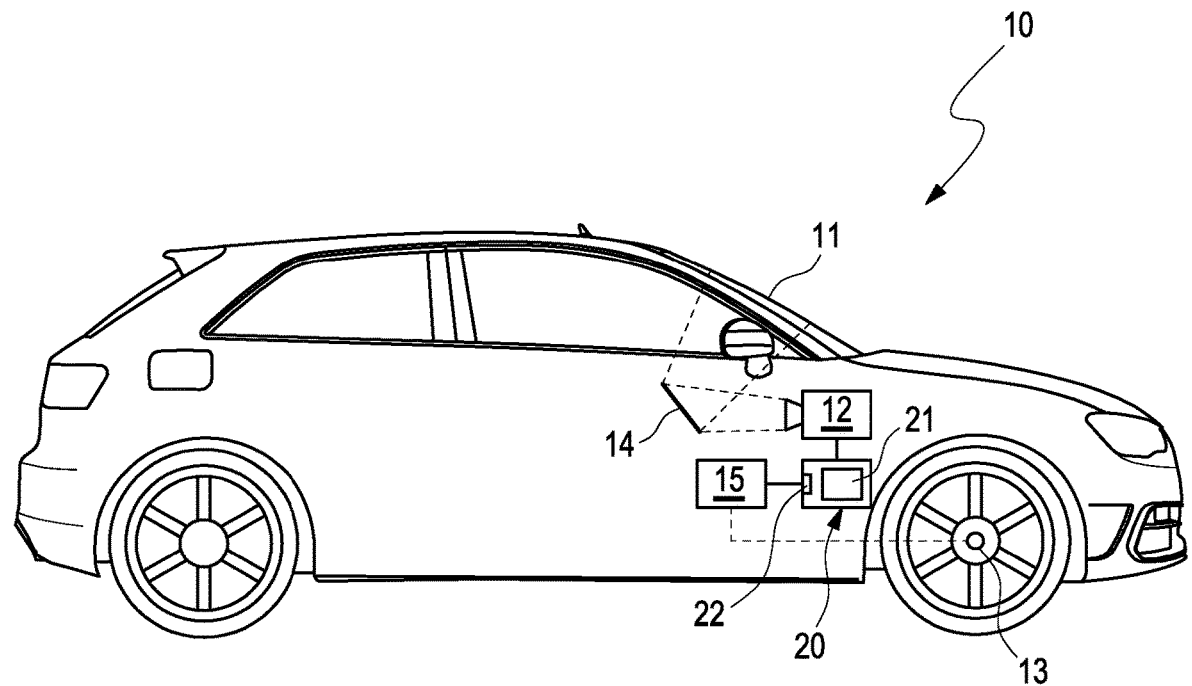
FIG. 1 shows a schematic illustration of a vehicle according to one embodiment of the invention.

FIG. 1 shows a schematic illustration of a vehicle 10 according to one embodiment of the invention. The vehicle 10 comprises an ESP control device 15 having a sensor 13 providing a value 25 (see FIG. 2) of a driving speed of the vehicle 10 and designed as a wheel speed sensor, and a head-up display having a windshield 11, a display unit 12 associated with the windshield 11, a mirror 14 associated with the display unit 12, and a control device 20, which is connected to the display unit 12 and to the sensor 13. The control device 20 is indirectly connected here to the sensor 13 via the ESP control device 15, but can alternatively be connected via a further control device of the vehicle 10, for example, a navigation device, or can also be directly connected to another sensor of the vehicle.

Figure 2:
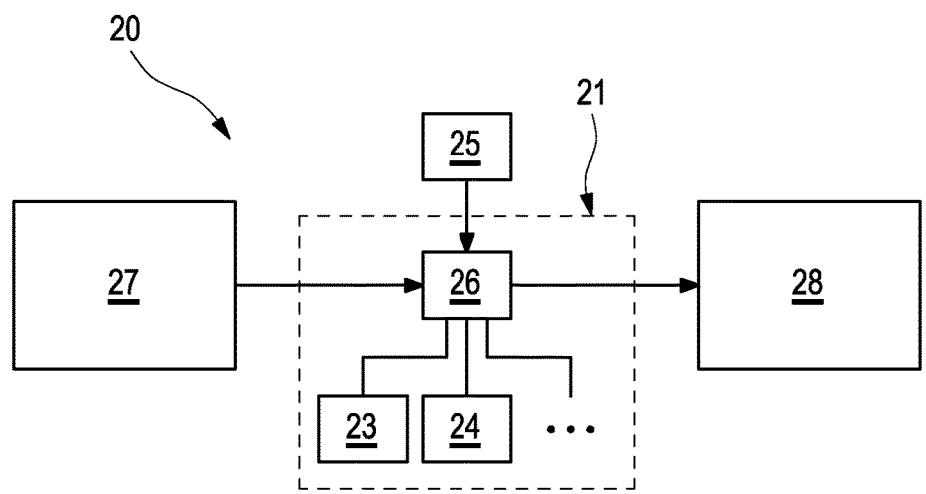
FIG. 2 shows a schematic illustration of a partial block diagram of a control device according to one embodiment of the invention.

FIG. 2 shows a schematic illustration of a partial block diagram of a control device 20 according to one embodiment of the invention. The control device 20 is suitable for the head-up display of the vehicle 10 and comprises an interface 22. The interface 22 is configured to receive a value 25 of a driving speed of the vehicle 10.

Furthermore, the control device 20 comprises a constant warping matrix 23 associated with the value zero of a driving speed of the vehicle 10 and a constant warping matrix 24 associated with a predetermined nonzero value of the driving speed. Of course, the control device 20 can comprise further constant warping matrices which are associated with further nonzero predetermined values of the driving speed different from one another.

The control device 20 also includes an interpolation module 21. The interpolation module 21 is configured to interpolate a warping matrix 26 for a received value 25 of the driving speed different from each predetermined value, starting from at least one of the two warping matrices 23, 24 and as a function of the received value 25 of the driving speed.

By means of the above components, the control device 20 is configured to transform a display image 27 to be displayed by means of the windshield 11 of the vehicle 10 into a reflection image 28 to be reflected on the windshield 11 and to determine the warping matrix 26 as a function of the received value 25 of the driving speed of the vehicle 10 for transforming the display image 27.

During operation, i.e., during driving of the vehicle 10, the head-up display is continuously operated in real time as follows. The control device 20 receives a current value 25 of the driving speed of the vehicle 10 from the sensor 13 and determines a warping matrix 26 for transforming the display image 27 as a function of the received value 25 of the driving speed. For this purpose, the interpolation module 21 uses the two constant warping matrices 23, 24 and possibly further constant warping matrices.

If the received value 25 of the driving speed is different from each predetermined value of the driving speed, the interpolation module 21 interpolates the warping matrix 26 starting from at least one of the two constant warping matrices 23, 24, ideally starting from both constant working matrices 23, 24 and possibly further constant working matrices, and as a function of the received value 25 of the driving speed. Otherwise, the interpolation module 21 uses the constant warping matrix 23, 24 associated with the received value 25 as the warping matrix 26 directly without interpolation.

By means of the determined warping matrix 26, the control device 20 transforms the display image 27 to be displayed by means of the windshield 11 of the vehicle 10 into a reflection image 28 to be reflected from the windshield 11. In a further step, the display unit 12 displays the transformed reflection image 28, which a driver of the vehicle 10 perceives as the distortion-free display image 27 on the windshield 11 at any driving speed of the vehicle 10.

The invention claimed is:

1. A method for operating a heads-up display of a vehicle, comprising:
   a control device of a vehicle transforms a display image to be displayed by means of a windshield of the vehicle into a reflection image to be reflected from the windshield;
   a display unit of the heads-up display of the vehicle associated with the windshield displays the transformed reflection image; and
   the control device for transforming the display image determines a warping matrix as a function of a value of a driving speed of the vehicle,
   wherein the speed-dependent determination of the warping matrix comprises at least two constant warping matrices, each associated with predetermined values of the driving speed which are different from one another, and
   wherein the speed-dependent determination of the warping matrix for a value of the driving speed different from each predetermined value of the driving speed comprises an interpolation starting from at least one constant warping matrix associated with one of the predetermined values of the driving speed as a function of the value of the driving speed.

2. The method as claimed in claim 1, wherein one of the at least two constant warping matrices is associated with a zero value driving speed of the vehicle, and
   wherein one of the at least two constant warping matrices is associated with a nonzero value driving speed of the vehicle.

3. The method as claimed in claim 2, wherein the control device receives the value of the driving speed indirectly or directly from a sensor of the vehicle.

4. The method as claimed in claim 1, wherein the control device receives the value of the driving speed indirectly or directly from a sensor of the vehicle.

5. A control device comprising:
   a heads-up display of a vehicle configured to:
      transform a display image to be displayed by means of a windshield of a vehicle into a reflection image to be reflected from the windshield,
      determine a warping matrix for transforming the display image as a function of a value of a driving speed of the vehicle, and
   store at least two constant warping matrices, each associated with predetermined values of the driving speed which are different from one another,
   wherein the speed-dependent determination of the warping matrix for a value of the driving speed different from each predetermined value of the driving speed is interpolated by an interpolation module starting from at least one constant warping matrix associated with one of the predetermined values of the driving speed as a function of the value of the driving speed.

6. The control device as claimed in claim 5, wherein one of the at least two constant warping matrices is associated with a zero value driving speed of the vehicle, and
   wherein one of the at least two constant warping matrices is associated with a nonzero value driving speed of the vehicle.

7. The control device as claimed in claim 6, comprising an interface, which is configured to receive a value of a driving speed of the vehicle.

8. The control device as claimed in claim 5, comprising an interface, which is configured to receive a value of a driving speed of the vehicle.

\* \* \* \* \*